Figure 1:
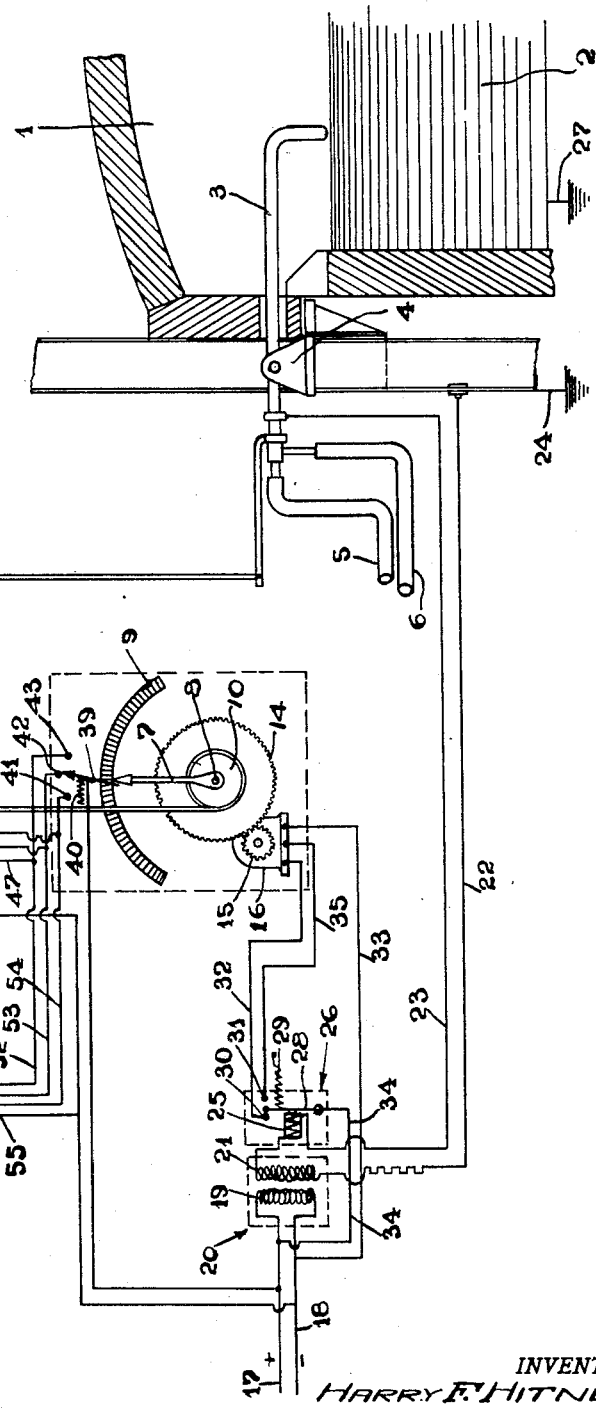

Feb. 25, 1936.  H. F. HITNER  2,032,016
LEVEL INDICATING APPARATUS
Filed May 22, 1933   2 Sheets-Sheet 1

INVENTOR
HARRY F. HITNER.
BY Bradley & Ba
ATTORNEYS.

Feb. 25, 1936.  H. F. HITNER  2,032,016

LEVEL INDICATING APPARATUS

Filed May 22, 1933   2 Sheets-Sheet 2

INVENTOR
HARRY F. HITNER.
BY Bradley & Bee
ATTORNEYS

Patented Feb. 25, 1936

2,032,016

UNITED STATES PATENT OFFICE 2,032,016

LEVEL INDICATING APPARATUS

Harry F. Hitner, Oakmont, Pa., assignor to Pittsburgh Plate Glass Company, a corporation of Pennsylvania Application May 22, 1933, Serial No. 672,246

4 Claims. (Cl. 177—351)

The invention relates to a level indicating apparatus for tanks containing a molten bath. The invention is particularly designed for use with glass tanks, but is applicable in connection with other materials which are conductors of electricity when in a molten condition. Heretofore, it has been the practice in level indicating apparatus to use as the control element, either a float which operated (either directly or indirectly) the indicating lights or a pointer, or contact elements in an electric circuit, of which the molten bath formed a part. Both of these methods involve objectionable features. A float is attacked by the bath so that the apparatus must be adjusted at more or less frequent intervals to compensate for the loss of mass in the float which lowers its level in the bath, while the contact elements are inaccurate in their indication, because the material of the bath tends to adhere to them and form strings when the elements would otherwise be out of electrical contact with the bath. One of the principal objects of the present invention is to provide an improved apparatus which avoids the disadvantages incident to floats and contact members, as above pointed out. A further object is to provide an improved apparatus of simple construction, which is reliable in operation and indicates within very close limits the level of the molten bath. The invention in its preferred form centers around the principle of employing a member as the control element, forming part of a high voltage circuit, which never contacts with the surface of the bath, but which becomes part of an electric circuit, of which the bath itself is a part, when the element is brought close enough to the bath to permit an arcing of the high voltage current from the element to the bath. The vertical position of the element is regulated by a reversing motor which operates to lift the element when it is close enough to permit an arc to form between it and the bath, and which operates to lower the element when the arc is broken. When the device is to be used with a bath which will not adhere to the control element or finger, or in those cases in which a close indication of the level of the bath is not required, the construction may be modified to permit the control member to touch the bath, and in such case, there is no necessity of using high voltage in order to provide an arc, and the apparatus may, therefore, be somewhat simplified. Certain embodiments of the invention are shown in the accompanying drawings, wherein:

Figure 1 is a diagrammatic view of one form of apparatus. And Figs. 2 to 6 illustrate modifications, Figs. 3 to 6 being diagrammatic views.

Referring to Fig. 1 of the drawings, 1 is a glass tank containing a body of molten glass 2, and 3 is a hollow control element or finger pivoted upon a suitable bracket 4, and cooled by means of water supplied through the flexible connections 5 and 6. The indicating means include a pointer 7, which is secured to a shaft 8 and has its end in proximity to the graduated arc 9. The shaft 8 carries a drum 10 around which passes a wire 11. This wire extends over pulleys 12 and 13 and has its end secured to the outer end of the control member 3.

The shaft 8 also carries a gear 14, meshing with the driving pinion 15 of the split field motor 16. The motor is of the slow running type similar to that used in an electric clock with a high gear reduction in the casing, and there is a further substantial gear reduction between the shaft carrying the pinion 15 and the shaft 8, so that the pointer 7 and the inner end of the element 3 move very slowly when the motor is running, the speed of movement of the inner end of the element 3 which opposes the surface of the bath being preferably about .01 of an inch per second.

Current is supplied, preferably at 110 volts, from the leads 17 and 18, which are connected to the primary coil 19 of the transformer 20. The windings of the transformer are such that a voltage of about 1000 is induced in the secondary coil 21, which is in circuit with the wires 22 and 23. The wire 22 is connected to a ground 24, while the wire 23 is in circuit with the winding 25 of the relay 26 and is connected at its end with the control element 3. The molten body of glass is grounded, as indicated at 27. A high voltage circuit is thus provided, which includes the control element 3, the molten bath 2, the wire 22, the relay winding 25, and the wire 23. The relay arm 28 is normally pulled to the right by a spring 29 and its end is adapted to engage the contacts 30 and 31 depending upon its position.

The motor 16 is of the reversing split field type, and when the relay arm 28 is in the position shown, current flows to and through the motor via the wire 17, the arm 28, the wire 32, and the wire 33, the motor under these conditions being rotated so as to move the control element 3 away from the surface of the bath. When the relay winding 25 is not energized and the arm 28 is moved to the right by the spring 29, thus making contact with 31, current flows to and through the other field coil of the motor via the wire 34, the arm 28, the wire 35, and the wire 33. The motor is now driven in the reverse direction, and the control element 3 is moved toward the surface of the bath.

In operation, the control element is continuously moved toward and from the bath within a very narrow range of movement and the movement of the pointer back and forth is very slight. When the glass is at the proper level, the pointer will occupy the central position (with respect to the graduated arc 9) as shown; when the level of the bath drops below the proper point, the pointer will occupy a position to the left of that shown; and when the bath level is too high, the pointer will occupy a position to the right of that shown. In its movement down, the element 3 will not contact with the bath since, due to the high voltage in the secondary circuit, including the element and the bath, an arc will occur between the element and the bath when the element is still spaced away from the bath a distance of from one-eighth to one-sixteenth of an inch (depending on the voltage), and a circuit will be established through the relay coil 25 moving the arm 28 to the position shown, so that current flows through the motor circuit and starts the element 3 upward. This immediately interrupts the secondary circuit so that the relay coil is de-energized, permitting the arm 28 to be moved to the right and reversing the current through the motor. The movement of the inner end of the element 3 up and down is in practice about one-sixteenth of an inch, and the end of the pointer 7 vibrates back and forth about one quarter of an inch, but these figures will vary depending upon the proportion of the parts and the voltage employed.

The pointer 7 may constitute the only indicating means, but if desired, additional or alternate indicating means, such as lamps and recording instruments, may be employed, indicated in Fig. 1. If incandescent lamps are employed, they are preferably three in number and of different colors, such as red, white, and green. These lamps 36, 37 and 38 are operated by means of the switch 39, whose upper end is yieldingly pulled to the left by the spring 40, and whose lower end is engaged by the pointer 7. When the glass level is normal, the switch engages the middle one of the three contacts 41, 42 and 43, and current flows through the white lamp 37 via the wires 46 and 45. When the glass level is too low, the switch engages the contact 41 and current flows through the red lamp 38 via the wires 44 and 45. When the glass level is too high, the switch engages the contact 43 and current flows through the green lamp 36 via the wires 47 and 45.

The recording apparatus may be of any approved type and is indicated diagrammatically at 48, in which three coils 49, 50, and 51 are shown for operating recording means (not shown). The wires 52, 53, and 54 lead to these coils from the contacts 41, 42, and 43, the other ends of the coils being connected to the return wire 45 by means of the wire 55.

Figure 2:
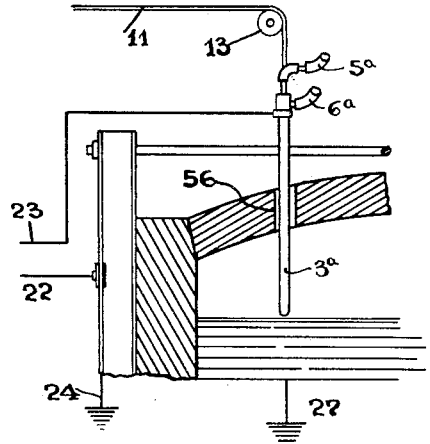

Fig. 2 illustrates a modification which differs from that of Fig. 1 only in the character of the control element 3a, such element being straight throughout and being operated through the opening 56 in the crown of the tank. This element is shown as water cooled by means of the connections 5a and 6a as in the other type of construction, the purpose being to protect the element and reduce the tendency of the glass to adhere thereto if it should come into contact with the glass. It will be understood, however, that water cooling is not necessary if a refractory material is used, or if a refractory such as clay is used, to protect a wire of suitable conducting material.

Figure 3:
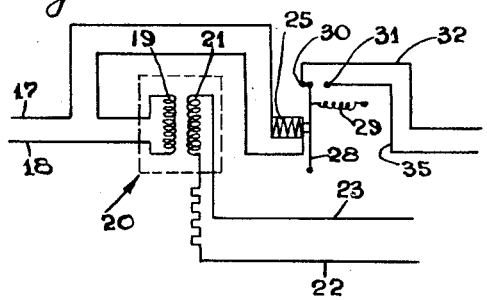

Fig. 3 illustrates a modification similar to that of Fig. 1 except that the winding of the relay 25 is placed in circuit with the primary coil 19 of the transformer instead of being in circuit with the secondary coil 21, as is the case in the Fig. 1 construction. The other connections are the same as in the Fig. 1 construction and similarly numbered. In the operation of this apparatus, changes in current through the wires 23 and 22 leading respectively to the control element and the bath induce changes in the flow of current through the primary circuit and these changes of flow in the primary circuit actuate the relay. That is, when the control element 3 approaches the bath sufficiently to permit arcing and thus completes secondary circuit, an increase in current through the primary coil 19 occurs, causing an increase in flow through the winding 25 sufficient to move the arm 28 to the position shown, and when the element 3 is moved away from the bath, breaking the secondary circuit, the flow of current through the primary circuit is reduced so that the arm 28 is moved to the right by the spring 29, thus reversing the motor.

Figure 4:
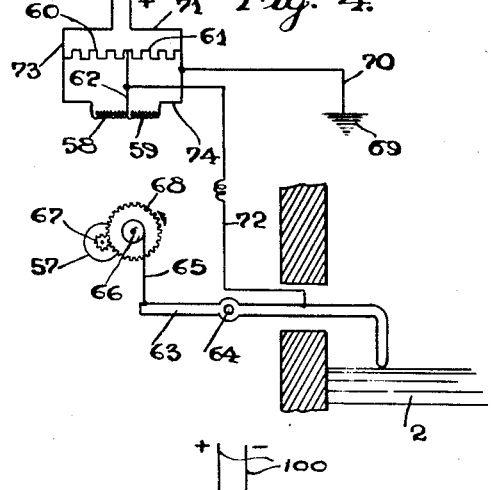

Fig. 4 illustrates in a diagrammatic way a further modification in which no transformer and relay are required. The motor employed is a two-coil motor 57. The diagram above the motor in the figure illustrates the winding thereof, 58 and 59 being the two coils, and 60 and 61 being two sections of resistance whose relative degree is regulated by the arm 62. The resistance in the section 61 is about ten times that of the section 60. The control element 63 is pivoted at 64. The outer end of the control element is connected to a wire 65 which is wound on the drum 66 driven from the motor 57 by reduction gearing, including the pinion 67 and spur wheel 68. The bath 2 is grounded, as indicated at 69, and a wire 70 leads to the supply lead 71. The shaft of the drum 66 is provided with an indicating pointer (not shown) as in the Fig. 1 construction.

When the control element approaches the glass close enough to permit an arc or contacts with the glass, a flow of current through the motor winding 58 occurs via the lead 71, the bath, the control element 63, the wire 72, and the lead 73. This causes the motor 57 to rotate in a direction to move the inner end of the control element away from the bath, breaking the circuit. When the circuit is thus broken, current flows through the other motor winding 59 via the lead 71, the wire 74, the arm 62, the resistance section 60, and the lead 73. This causes the motor to run in a direction to move the inner end of the control element 3 downward. An up and down movement of the control element, and an operation of the indicating mechanism occurs in the manner heretofore described in connection with the Fig. 1 construction.

Figure 5:
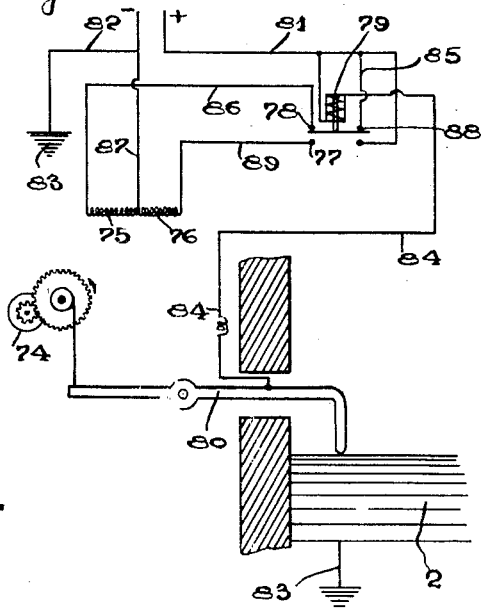

Fig. 5 illustrates in a diagrammatic way a further modification in which the secondary circuit is omitted, but which employs a relay. The motor 74 is of the reversing split field type having the windings 75 and 76, and the driving and indicating mechanism is the same as that described in connection with Figs. 1 and 4. The relay has two sets of contacts 77 and 78 and its winding 79 is in series with the bath 2 and control element 80, via the leads 81 and 82, the ground 83, and the wire 84. When the control element touches the glass or approaches close enough to permit arcing, the winding 79 is energized and the relay bar engages the contacts 78, so that current flows through the motor winding 75 via the wires 85 and 86, and the return wire 87, thus driving the motor in one direction. When the control element is moved away from the bath, the circuit through the relay winding is broken and the relay bar engages the contacts 77. Current now flows through the other motor winding 76 via the wires 81 and 89 and the return wire 87, so that the motor is driven in the reverse direction.

Figure 6:
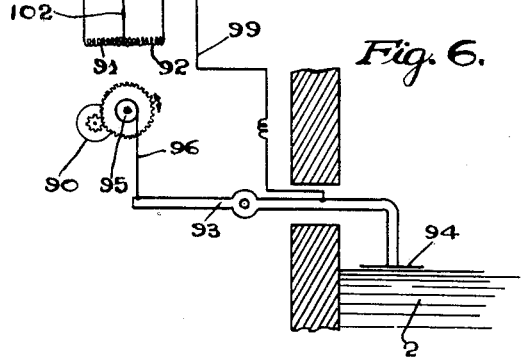

Fig. 6 illustrates in a diagrammatic way a modification of the invention in which a condenser effect is utilized in connection with the control element. A split field reversing motor 90 with the windings 91 and 92 is employed as in the other types of construction, and the driving and indicating mechanism is the same. The control element 93 is in this instance provided at its inner end with a plate 94 and the other end of the element is connected to the drum 95 by the wire 96, as heretofore described. The current through the motor windings 91 and 92 is governed by capacity control panel 97, which has a control circuit including the element 93, the bath 2 grounded at 98, and the connection 99. Current for operating the motor is supplied to the panel by the leads 100 leading into the panel and by the connections 101, 102 and 103 leading from the panel to the windings 91 and 92. When the plate 94 approaches close to the surface of the bath, a condenser effect results which varies the capacity of the circuit which includes the element 3, the bath, and the connection 99, thus operating relay mechanism (of a type well known in the art) in the control panel, so that current is directed through the motor winding 91 and causes such motor to rotate so as to move the plate 94 upward. This upward movement of the plate immediately varies the capacity of the control circuit so that the switch mechanism in the control panel directs operating current through the motor winding 91, thus reversing the motor so that it now moves the plate 94 toward the bath, the cycle being repeated indefinitely as heretofore explained.

If desired, the indicating apparatus as disclosed herein may be used to control the operation of a batch feeder as shown in the copending application of H. L. Halbach and D. R. Limbers, Serial No. 500,575, filed December 6, 1930. The flow of current between the control element and the bath (when the control element approaches, but does not actually contact with the glass) is referred to herein as constituting an "arc", but it will be understood that this term is used in a broad sense to mean any bridging action of an electric current, as the flow in the present apparatus appears visually as a series of minute sparks rather than the continuous flow characteristic of the ordinary lighting or heating arc.

What I claim is:

1. A means responsive to the level of a bath of molten glass comprising, an element mounted for movement toward and from the surface of said bath, motor means for controlling said movement, means for controlling said motor means comprising a circuit including a relay, a source of current at high voltage, the movable element and the bath, whereby, upon close approach of said element to said bath, but before actual contact therewith, a current flows in said circuit causing the element to recede from the bath whereupon the current is sufficiently reduced to again cause the element to approach the bath, and additional means to be controlled operatively connected to said motor means.

2. A means responsive to the level of a bath of molten glass comprising, an element mounted for movement toward and from the surface of said bath, motor means for controlling said movement, means for controlling said motor means comprising a circuit including a source of current at high voltage, the movable element and the bath, whereby, upon close approach of said element to said bath, but before actual contact therewith, a current flows in said circuit causing the element to recede from the bath whereupon the current is sufficiently reduced to again cause the element to approach the bath, and additional means to be controlled operatively connected to said motor means.

3. A means responsive to the level of a bath of molten glass comprising, an element mounted for movement toward and from the surface of said bath, motor means for controlling said movement, comprising a split field reversing motor, means for controlling said motor means comprising a circuit, means for controlling the flow of current through the split field of the motor, a source of current at high voltage, the movable element and the bath, whereby, upon close approach of said element to said bath, but before actual contact therewith, a current flows in said circuit causing the element to recede from the bath whereupon the current is sufficiently reduced to again cause the element to approach the bath, and additional means to be controlled operatively connected to said motor means.

4. A means responsive to the level of a bath of molten glass comprising, an element mounted for movement toward and from the surface of said bath, motor means for controlling said movement, a source of current supply for operating the motor means, a transformer whose primary low voltage coil is energized from said source of current supply, means for controlling the motor means comprising a circuit including a relay, the secondary high voltage coil of the transformer, the movable element and the bath, whereby, upon close approach of said element to said bath, but before actual contact therewith, a current flows in said circuit causing the element to recede from the bath whereupon the current is sufficiently reduced to again cause the element to approach the bath, and additional means to be controlled operatively connected to said motor means.

HARRY F. HITNER.